Aug. 24, 1943. S. M. SUTTON 2,327,831
CABLE PULLING ATTACHMENT
Filed Nov. 24, 1942 3 Sheets-Sheet 1
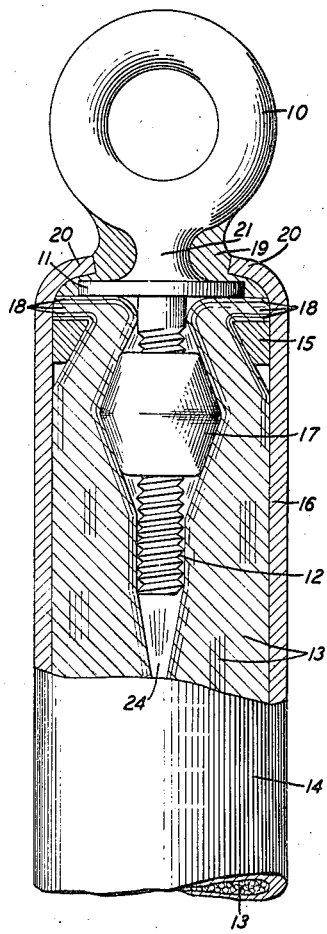
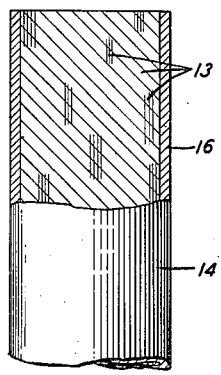
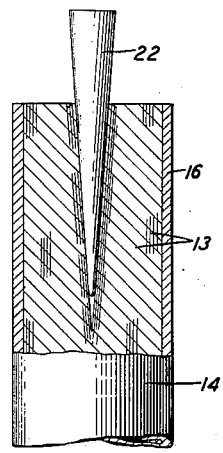
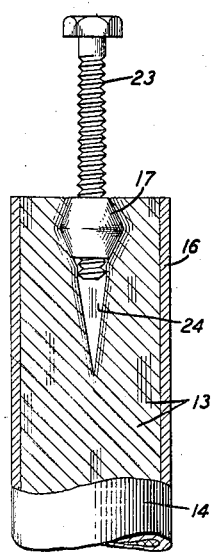
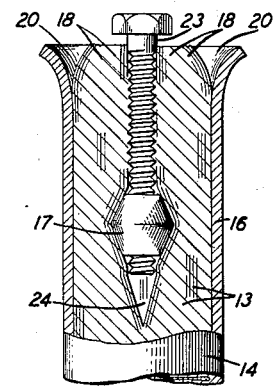
INVENTOR
S. M. SUTTON
BY J. MacDonald
ATTORNEY Aug. 24, 1943.   S. M. SUTTON   2,327,831
CABLE PULLING ATTACHMENT
Filed Nov. 24, 1942   3 Sheets-Sheet 2

INVENTOR
S. M. SUTTON
BY J. MacDonald
ATTORNEY

Aug. 24, 1943.   S. M. SUTTON   2,327,831
CABLE PULLING ATTACHMENT
Filed Nov. 24, 1942   3 Sheets-Sheet 3

INVENTOR
S. M. SUTTON
BY J. MacDonald
ATTORNEY

Patented Aug. 24, 1943

2,327,831

UNITED STATES PATENT OFFICE 2,327,831

CABLE PULLING ATTACHMENT

Stanford M. Sutton, Morristown, N. J., assignor to Bell Telephone Laboratories, Incorporated, New York, N. Y., a corporation of New York Application November 24, 1942, Serial No. 466,823

12 Claims. (Cl. 24—123)

This invention relates to cable pulling attachments and more particularly to means for conveniently making a strong attachment to the end of a lead sheath cable.

The object of this invention is to provide a means, adapted to be secured to the end of a lead sheath cable, which will effectively seal the cable against the escape of gas and provide means for securing the winch or pulling line thereto.

Another object of this invention is the provision of a cable pulling attachment which may be conveniently secured to the end of the cable at the factory.

A further object of this invention is the provision of a cable pulling attachment which renders only a small portion of the cable unfit for use after the cable has been pulled in.

A still further object of the invention is the provision of a cable pulling attachment which has great holding power and provides a minimum amount of movement between the sheath and the core structure of the cable.

Heretofore attachments to lead sheath cables for the purpose of securing a towing line thereto for pulling the cable into underground conduits and through cable rings have either been of the woven wire basket type or the core hitch type.

While the well-known woven wire basket grip is perhaps the most convenient of the two to apply, its primary objection is that the pulling load is carried almost entirely by the sheath of the cable and develops only a small part of the total strength of the cable. Furthermore, there is always the definite hazard of losing a cable by the parting of the sheath back of the grip when the pulling loads are greater than expected. It has also been found that the basket type of wire grip wears out quite rapidly due to the friction exerted between the grip and the walls of the conduit or rings through which it passes.

In those instances where exceptionally heavy pulling loads are anticipated, the core type hitch is used. The core type hitch is made in the field by removing about eighteen inches or two feet of the lead sheath so as to expose the wires of the core. The paper insulation on the wire is then burned off and the wires twisted together to form several strands. These strands are threaded through an eye from opposite sides and back upon themselves and bound in place with a piece of soft wire. Two rings are beaten into the sheath a short distance in back of the cut portion of the sheath and a tight serving of marline is made around all of the wires. The entire hitch is then given a heavy coating of cable grease.

The applicant, realizing the shortcomings of the present types of cable pulling attachments as outlined above, has devised an attachment which is intended to be secured to the end of the cable before it leaves the factory, thereby eliminating the necessity of making such attachments in the field.

The cable attachment of this invention is so designed that it grips both the core wires and the sheath, thereby distributing equally the strain applied to the cable. Furthermore, it enables the cable to be filled with gas at the factory and shipped in this condition since the attachment effectively seals the end of the cable against the escape of gas and the consequent entrance of moisture.

In accordance with my invention I embed in the center of the core wires an eye bolt or a threaded member having an enlarged inner member threadedly mounted thereon and adapted to travel upwardly as the threaded member is rotated. The upward travel of the member securely clamps the core wires between an upper flange on the threaded member and a washer located between the sheath and the outer layer of wires of the core. The upper end of the cable sheath is bent over into contact with the outer surface of the flange heretofore referred to and securely fastened there by soldering or clamping.

The invention will be more clearly understood from the following detailed description when read with reference to the following drawings of which:

Fig. 1 is an enlarged view partly in section of the end of a cable with the attachment of this invention secured thereto;

Fig. 2 is a fragment of cable with its end cut off squarely and the sheath partially removed to expose the core wires;

Fig. 3 is a view similar to Fig. 2 and shows the first step in securing the attachment of the invention, i. e., driving a tapered pin downward between the core wires to spread them apart;

Fig. 4 illustrates the second step, i. e., inserting a threaded member with a tapered member mounted on the end thereof into the opening formed by the tapered pin;

Fig. 5 shows the threaded member with the tapered member mounted thereon driven well down into the core of the cable and the top of the sheath flared outwardly with the core wires bent inwardly toward the threaded member;

Figure 6:
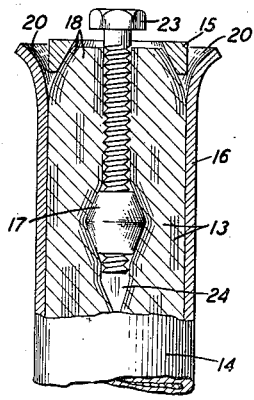
Fig. 6 is a view similar to Fig. 5 but with a washer having a tapered inner bore placed over the top of the core wires.

In accordance with the preferred form of my invention as shown in Fig. 1, an eye bolt 10 having an integral flange 11 adjacent to the eye and a threaded shank portion 12, is firmly embedded in the core wires 13 of the lead sheath cable 14. The core wires 13 have been bent back over the ring or washer 15 which has been forced down between the outer layer of the core wires 13 and the inner wall of the lead sheath 16, and clamped between the inner surface of the flange 11 and the top of the ring 15. The clamping of the core wires is effected by turning the eye bolt 10 clockwise which causes the internally threaded tapered member 16 to travel upwardly and compress the ends 18 of the core wires 13 between both the inner surface of the flange 11 and the top of the ring 15, as heretofore described, and between the upper tapered portion of the threaded member 17 and the inner tapered bore of the ring 15. In order to prevent the entrance of moisture and to make the cable gas tight, a small amount of solder, as shown at 19, is run in between the beaten-over end 20 of the lead sheath 16 and the upper shank portion 21 of the eye bolt 10 to completely fill the space therebetween.

The above structure provides a cable pulling attachment which is as strong as the cable itself and which can be conveniently applied at the factory and will not interfere with the reeling of the cable and which will permit the cable to be shipped on reels under gas pressure.

In applying the cable pulling attachment of this invention to the end of a lead sheath cable, the first step, as shown in Fig. 2, is to cut off the end of the cable 14 squarely. The next step, as shown in Fig. 3, is to drive a tapered pin 22 down into the center of the core wires 13 to spread the wires apart and form an opening 24. After the tapered pin 22 has been driven down the required distance and removed, a threaded bolt 23 having a threaded tapered member 17 located on its end is positioned in the opening 24 formed by the tapered pin, as shown in Fig. 4, and driven downwardly until the head of the bolt 23 almost contacts the ends of the core wires 13, as shown in Fig. 5.

After the bolt 23 has been positioned, as shown in Fig. 5, the ends 18 of the core wires 13 are bent inwardly and the end 20 of the sheath 14 is flared outwardly, as shown in Fig. 5.

Figure 7:
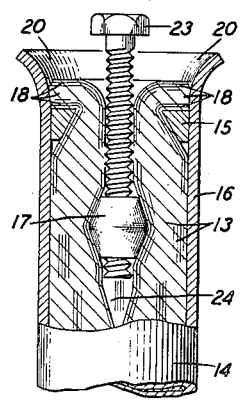
Fig. 7 shows the tapered washer forced down between the inner wall of the sheath and the outside of the core wire with the core wires bent back over the top of the washer.

After the ends 18 of the core wires 13 have been bent inwardly and the end 20 of the sheath flared outwardly as heretofore described, a ring or washer 15, having a tapered inner bore, is placed over the ends 18 of the core wires 13, as shown in Fig. 6, and driven downwardly between the outer layer of core wires and the inner surface of the cable sheath 16 as shown in Fig. 7. The ends 18 of the core wires 13 are bent outwardly over the ring 15 and pressed firmly into contact therewith as shown in Fig. 7.

Figure 8:
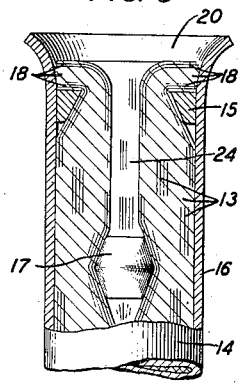
Fig. 8 is a view similar to Fig. 7 with the threaded member removed and the tapered member in place.

After the above operations have been completed the bolt 23 is unscrewed, thus leaving the tapered member 17 positioned in the bore of the cable at the bottom of the opening 24 as shown in Fig. 8.

Figure 9:
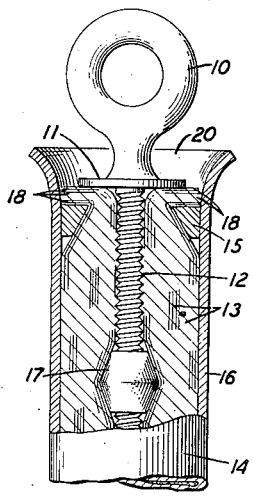
Fig. 9 shows a threaded eye bolt replacing the threaded member shown in Figs. 4, 5, 6 and 7 with the flange portion thereof bearing against the top of the bent-over core wires.
Figure 10:
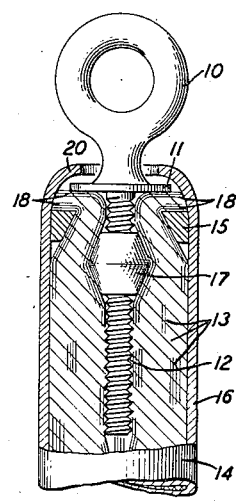
Fig. 10 is a view similar to Fig. 9 except that the end of the cable sheath has been beaten over the flange and is ready for the application of the solder as shown in Fig. 1.

As shown in Fig. 9, the next step is the insertion of the eye bolt 10 and its consequent engagement with the tapered member 17. Turning the eye bolt 10 clockwise causes the tapered member 17 to travel upwardly and compress the ends 18 of the core wires 13 between the inner surface of the flange 11 on the eye bolt 10 and the outer surface of the ring 15 and at the same time squeeze the ends of the core wires between the inner surface of the ring 15 and the outer surface of the tapered member 17 as shown in Fig. 10. The flared end 20 of the sheath 16 is then beaten over as shown and the void between the end of the sheath, the top of the flange 11 and the ends of the core wires 13 is filled with molten solder to form the completed attachment as shown in Fig. 1 as heretofore described.

Figure 11:
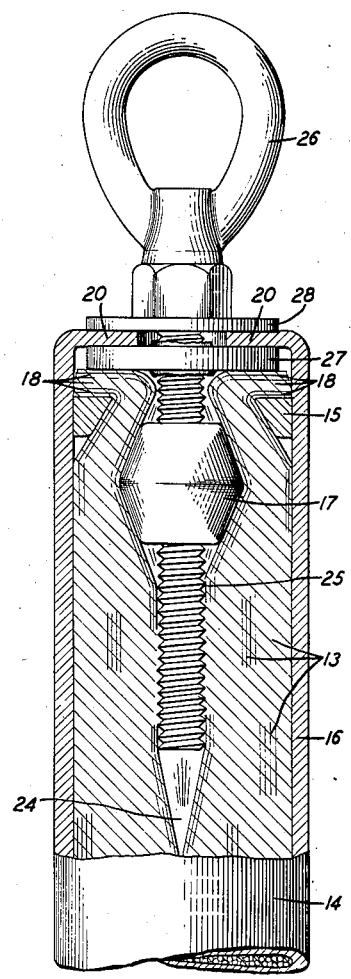
Fig. 11 is an enlarged view of a modified form of attachment in which no solder is employed, the seal being made by compressing the bent-over portion of the cable sheath between a flange on the threaded member and a washer on the outside.

In a modified form of my improved cable pulling attachment, as shown in Fig. 11, a threaded rod 25, having an eye nut 26 secured to its upper end, a washer 28 adjacent said nut, and a flange 27 welded thereto near its upper end below said washer and said eye nut, is firmly embedded in the core wires 13 of the lead sheath cable 14 in the same manner as the eye bolt attachment heretofore described and shown in Fig. 1. The principal difference between the modified form and the attachment heretofore described is that in the modified form no solder is used inasmuch as the seal between the pulling eye and the cable sheath is made by compressing the beaten-over end 20 of the cable sheath 16 between the flange 27 and the washer 28.

As shown in Fig. 11, the core wires 13 have been bent back over the ring or washer 15 and the ring forced down as heretofore described with regard to Fig. 1. The ends 18 of the core wires 13 are clamped between the inner surface of the flange 27 and the outer surface of the ring 15 and the beaten-over portion 20 of the sheath 16 is clamped between the outer surface of the flange 27 and the inner surface of the washer 28. The clamping of the ends of the core wires is effected by applying a loose-fitting nut 29 over the end of the threaded rod 25 and turning said rod clockwise which causes the threaded tapered member 17 to travel upwardly and compress the ends 18 of the core wires 13 between the inner surface of the flange 27 and the outer surface of the ring 15 as heretofore described and also between the upper tapered portion of the threaded member 17 and the inner tapered bore of the ring 15.

The clamping of the beaten-over portion 20 of the sheath 13 is effected by screwing home an eye nut 26, or in some instances, a nut 30 (Fig. 14) which later will be replaced by an eye nut 26. This action firmly clamps the beaten-over end 20 of the cable sheath and causes it to cold flow and make a gas-tight joint and at the same time make a strong mechanical connection thereto.

Figure 12:
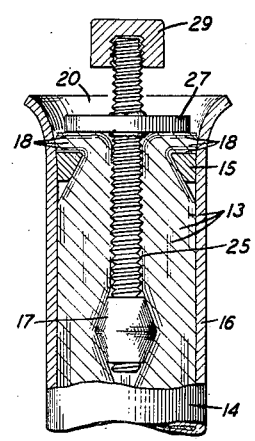
Fig. 12 is a view similar to Fig. 9 except that the threaded member is provided with a loose-fitting nut instead of an integral eye.
Figure 13:
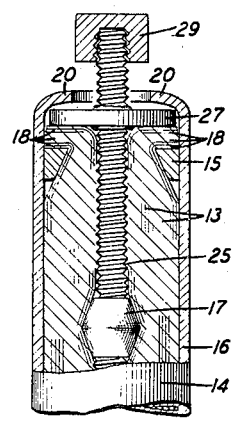
Fig. 13 is a view similar to Fig. 10 and illustrates the next step, i. e., the beating down of the end of the cable sheath.
Figure 14:
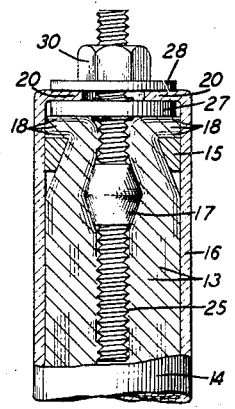
Fig. 14 is a view of the completed attachment prior to the removal of the compressing nut and the attachment of the pulling eye as shown in Fig. 11.

The modified form of attachment heretofore described is attached to the end of the cable in much the same manner as the attachment shown in Fig. 1, in that the procedure is the same up to the point where the permanent fitting is to be inserted. At this point in place of the eye bolt 10, I insert, as shown in Fig. 12, the threaded rod 25 with its temporary nut 29 positioned on the top thereof after the ends 18 of the core wires 13 have been bent over the ring 15. After the rod 25 is positioned as shown in Fig. 12, the end 20 of the sheath 16 is beaten over until it is in contact with the outer surface of the flange 27 as shown in Fig. 13, and the rod 25 rotated clockwise by means of the nut 29 until the tapered member 17 travels upwardly and compresses the ends 18 of the core wires 13 between the inner surface of the flange 27 and the outer surface of the ring 15 and between the inner tapered bore of the ring 15 and the outer surface of the tapered member 17, as shown in Fig. 14.

The temporary nut 29 is then removed and a washer 28 is fitted over the rod 25 and into contact with the bent-over end portion 20 of the cable sheath 16. An eye nut 26 or a nut 30, as shown, which later will be replaced by an eye nut 26, is then screwed home to compress the ends of the cable sheath to complete the attachment as shown in Figs. 11 and 14.

While there has been shown and described herein the preferred embodiment of my invention, it is not my intention to be limited to the precise details of construction shown as various modifications and changes may be made therein without departing from the spirit of the invention and I am only limited by the scope of the appended claims.

What is claimed is:

1. A pulling attachment for metallic sheath multi-conductor cables comprising a threaded member embedded in the end of the cable and coaxially disposed with respect to the sheath thereof, a nut mounted on said threaded member and bearing against said conductors, a ring positioned over the ends of said conductors, said conductors passing through said ring and bent over the top thereof, a flange integral with said threaded member in contact with said bent-over conductors for clamping said conductors against said ring and means surrounding said threaded member adjacent the end of said cable sheath for sealing said cable and making a connection thereto.

2. A pulling attachment for metallic sheath multi-conductor cables comprising a threaded member embedded in the end of the cable and axially disposed therein, a tapered nut mounted on said threaded member and bearing against said conductors, a ring positioned over the ends of said conductors, said conductors passing through said ring and bent over the top thereof, a flange integral with said threaded member in contact with said bent-over conductors for clamping said conductors against said ring and means surrounding said threaded member adjacent the end of said cable sheath for sealing said cable and making a connection thereto.

3. A pulling attachment for metallic sheath multi-conductor cables comprising a threaded member embedded in the end of the cable and coaxially disposed with respect to the sheath thereof, a tapered nut mounted on said threaded member and bearing against said conductors, a ring having a tapered bore positioned over the ends of said conductors and in contact with the inner wall of said cable sheath, said conductors passing through said ring and bent over the top thereof, a flange integral with said threaded member in contact with said bent-over conductors for clamping said conductors against said ring, and means surrounding said threaded member adjacent the end of said cable sheath for sealing said cable and making a connection thereto.

4. A pulling attachment for metallic sheath multi-conductor cables comprising a threaded member embedded in the end of the cable and coaxially disposed with respect to the sheath thereof, a nut mounted on said threaded member and bearing against said conductors, a ring positioned over the ends of said conductors, said conductors passing through said ring and bent over the top thereof, a flange integral with said threaded member in contact with said bent-over conductors for clamping said conductors against said ring, said cable sheath having its end portion bent over into contact with said flange and means surrounding said threaded member adjacent the bent-over portion of said cable sheath for sealing said cable and making a connection thereto.

5. A pulling attachment for metallic sheath multi-conductor cables comprising a threaded member embedded in the end of the cable and axially disposed therein, a tapered nut mounted on said threaded member and bearing against said conductors, a ring positioned over the ends of said conductors, said conductors passing through said ring and bent over the top thereof, a flange integral with said threaded member in contact with said bent-over conductors for clamping said conductors against said ring and means surrounding said threaded member adjacent the bent-over portion of said cable sheath for sealing said cable and making a connection thereto.

6. A pulling attachment for metallic sheath multi-conductor cables comprising an eye bolt having its shank portion embedded in the end of the cable and coaxially disposed with respect to the sheath thereof, a nut mounted on said shank and bearing against said conductors, a ring positioned over the ends of said conductors, said conductors passing through said ring and bent over the top thereof, a flange integral with said eye bolt in contact with said bent-over conductors for clamping said conductors against said ring and sealing material completely filling the void between the end of said sheath and the upper shank portion of said eye bolt.

7. A pulling attachment for metallic sheath multi-conductor cables comprising an eye bolt having its shank portion embedded in the end of the cable and axially disposed therein, a tapered nut mounted on said shank and bearing against said conductors, a ring positioned over the ends of said conductors and in contact with the inner wall thereof, said conductors passing through said ring and bent over the top thereof, a flange integral with said eye bolt in contact with said bent-over conductors for clamping said conductors against said ring and sealing material completely filling the void between the end of said sheath and the upper shank portion of said eye bolt for sealing said cable and making a connection thereto.

8. A pulling attachment for metallic sheath multi-conductor cables comprising an eye bolt embedded in the end of the cable and coaxially disposed with respect to the sheath thereof, a tapered nut mounted on the shank of said eye bolt and bearing against said conductors, a ring having a tapered bore positioned over the end of said conductors and in contact with the inner wall of said cable sheath, said conductors passing through said ring and bent over the top thereof, a flange integral with said eye bolt in contact with said bent-over conductors for clamping said conductors against said ring and sealing material completely filling the void between the end of said sheath and the upper shank portion of said eye bolt for sealing said cable and making a connection thereto.

9. A pulling attachment for metallic sheath multi-conductor cables comprising an eye bolt having its shank portion embedded in the end of the cable and axially disposed with respect to the sheath thereof, a nut mounted on said shank and bearing against said conductors, a ring positioned over the ends of said conductors, said conductors passing through said ring and bent over the top thereof, a flange integral with said eye bolt in contact with said bent-over conductors for clamping said conductors against said ring, said cable sheath having its end portion bent over into contact with said flange and means surrounding the upper shank portion of said eye bolt adjacent the bent-over portion of said cable sheath for sealing said cable and making a connection thereto.

10. A pulling attachment for metallic sheath multi-conductor cables comprising an eye bolt having its shank portion embedded in the end of the cable and axially disposed therein, a tapered nut mounted on said shank and bearing against said conductors, a ring positioned over the ends of said conductors and in contact with the inner wall thereof, said conductors passing through said ring and bent over the top thereof, a flange integral with said eye bolt in contact with said bent-over conductors for clamping said conductors against said ring, said cable sheath having its end portion bent over into contact with said flange and means surrounding said eye bolt adjacent the bent-over portion of said cable sheath for sealing said cable and making a connection thereto.

11. A pulling attachment for metallic sheath multi-conductor cables comprising a threaded member embedded in the end of the cable and coaxially disposed with respect to the sheath thereof, a nut mounted on said threaded member and bearing against said conductors, a ring positioned over the ends of said conductors, said conductors passing through said ring and bent over the top thereof, a flange integral with said threaded member in contact with said bent-over conductors for clamping said conductors against said ring, the end of said cable sheath bent over into contact with the outer surface of said flange, a washer positioned over the exposed end of the threaded member and bearing against the bent-over portion of said sheath and means on said threaded member for forcing said washer towards said flange to firmly clamp said sheath therebetween.

12. A pulling attachment for metallic sheath multiconductor cables comprising a threaded member embedded in the end of the cable and axially disposed with respect to the sheath thereof, a tapered nut mounted on said threaded member and bearing against said conductors, a ring having a tapered bore positioned over the end of said conductors, said conductors passing through said ring and bent over the top thereof, the outer surface of said ring being in contact with the inner wall of said sheath, a flange integral with said threaded member in contact with said bent-over conductors for clamping said conductors against said ring, the end of said cable sheath bent over into contact with the outer surface of said flange, a washer positioned over the exposed end of the threaded member and bearing against the bent-over portion of said sheath and means on said threaded member for forcing said washer towards said flange to firmly clamp said sheath therebetween.

STANFORD M. SUTTON.